United States Patent [19]

Lugosi et al.

[11] 4,260,924

[45] Apr. 7, 1981

[54] CONDUCTOR BAR FOR DYNAMOELECTRIC MACHINES

[75] Inventors: Robert Lugosi, Monroeville; George J. Fechko, Pittsburgh; Alan T. Male, Murrysville; Henry E. Haller, III, Pittsburgh; Cecil J. Mole, Monroeville, all of Pa.

[73] Assignee: Westinghouse Electric Corp., Pittsburgh, Pa.

[21] Appl. No.: 945,985

[22] Filed: Sep. 27, 1978

[51] Int. Cl.³ .............................................. H02K 3/14
[52] U.S. Cl. ..................................... 310/213; 310/64; 474/15 C; 474/34
[58] Field of Search .......................... 310/213, 45, 64; 174/15 C, 16 B, 34; 336/62, 187

[56] References Cited

U.S. PATENT DOCUMENTS

| Re. 27,206 | 10/1971 | Gabriel | 174/34 |
|---|---|---|---|
| 2,821,641 | 1/1958 | Ringland | 310/213 |
| 3,011,082 | 11/1961 | Ahrens | 310/213 |
| 3,185,872 | 5/1965 | Weissheimer | 310/213 |
| 3,602,751 | 8/1971 | Brenner | 310/213 |
| 3,825,783 | 7/1974 | Duffert | 310/213 |
| 4,128,779 | 12/1978 | Salon | 174/34 |

FOREIGN PATENT DOCUMENTS

| 630214 | 4/1936 | Fed. Rep. of Germany | 310/213 |
|---|---|---|---|
| 1030921 | 5/1958 | Fed. Rep. of Germany | 310/213 |
| 1124140 | 2/1962 | Fed. Rep. of Germany | 310/213 |
| 587188 | 1/1959 | Italy | 310/213 |
| 963790 | 7/1964 | United Kingdom | 310/213 |
| 1079815 | 8/1967 | United Kingdom | 310/66 |

*Primary Examiner*—R. Skudy
*Attorney, Agent, or Firm*—F. J. Baehr, Jr.

[57] ABSTRACT

A high efficiency conductor bar is provided for use in a high flux density environment. The bar is made up of a number of subconductors, each of which consists of strands of small size, insulated copper wire wound into twisted bundles and cables so as to be completely transposed. The subconductors and a tube for coolant fluid are then assembled into a conventionally transposed conductor bar.

5 Claims, 10 Drawing Figures

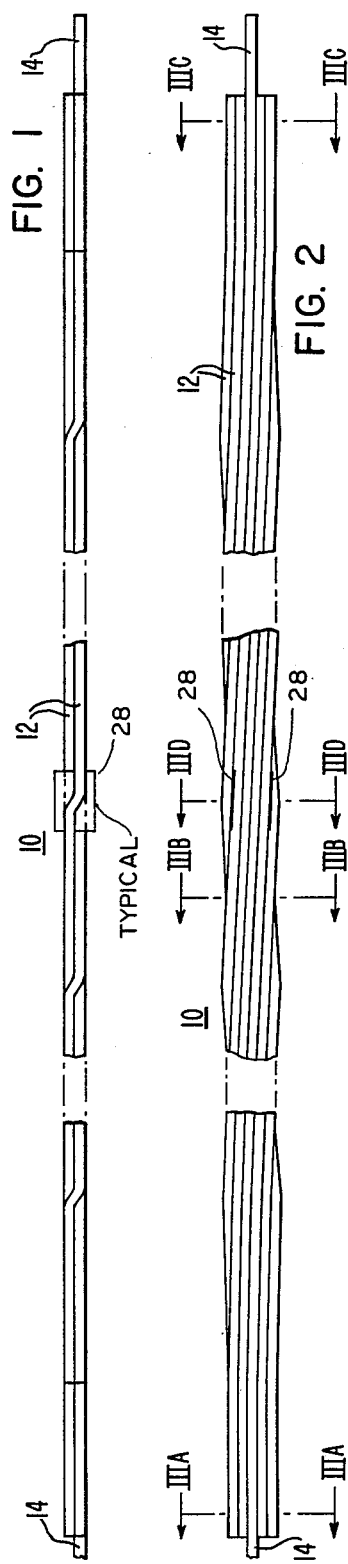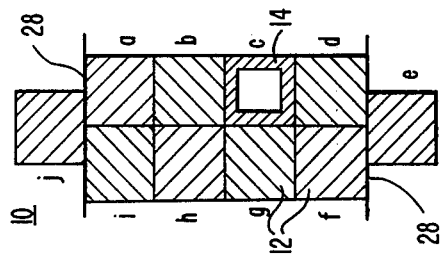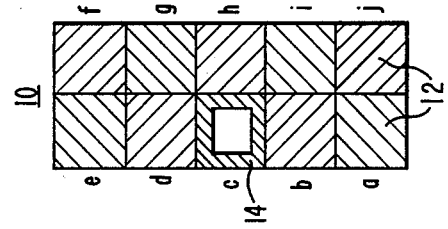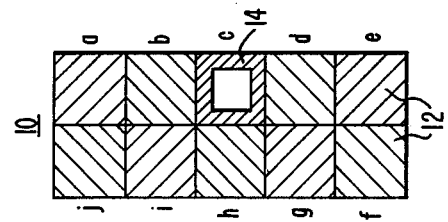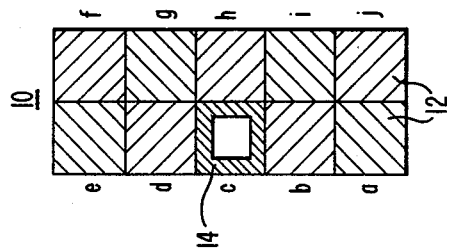

CONDUCTOR BAR FOR DYNAMOELECTRIC MACHINES

BACKGROUND OF THE INVENTION

The present invention relates to conductor bars for dynamoelectric machines, and more particularly to a high efficiency conductor with high current capacity.

The conductor of the present invention is particularly suitable for use in air gap windings for dynamoelectric machines of high power density. Advanced types of dynamoelectric machines now under development, such as those having superconducting field windings, for example, utilize air gap windings which operate in very high flux density environments, as compared to the windings of conventional machines. Such windings must be capable of carrying very high currents without excessive heating or losses, while the flux density requires fine stranding of the winding conductors with complete transposition of the strands.

These conditions require a stranded conductor made up of many small strands, and the dimensions of the strands must be approximately the same in both the radial and tangential directions of the machine. This requires round or square strands of very much smaller dimensions than the conductor strands that have been used in conventional dynamoelectric machines, and in order to minimize losses due to circulating currents, the strands must be fully transposed in both the radial and tangential directions. The use of a large number of small diameter strands, while it is necessary for minimizing eddy current losses, results in a relative increase in the amount of insulation in the conductor since each strand must be insulated at least for the expected strand-to-strand voltage. This has the effect of reducing the effective cross-section of copper which tends to increase the copper loss. The amount of insulation must, therefore, be kept to a minimum to provide as great a copper cross-section as possible within the overall dimensional limitations. It is desirable to prevent excessive temperature rise due to the losses in the conductor, which requires provision for circulating water, or other coolant fluid, through the conductor, as by means of a coolant tube incorporated in the conductor bar. These various design requirements cannot be met by any existing type of conductor bar construction used in conventional dynamoelectric machines.

SUMMARY OF THE INVENTION

The present invention provides a new type of high efficiency conductor bar for use in dynamoelectric machines of high power density which meets all the requirements outlined above and which can readily be manufactured.

In accordance with the invention, the conductor bar is made up of a number of subconductors, each of which consists of strands of relatively small, insulated copper wire, the insulation thickness being kept to a minimum. The strands are assembled utilizing conventional cabling devices to twist and fully transpose the strands. In one method of assembling the subconductors, the strands are assembled into twisted bundles of strands, each consisting of several strands, and several of these bundles together with a number of individual strands are then twisted together into a cable in such a manner that the strands are fully transposed within the cable. This cable is then compacted and reduced by a series of dies and formed into a square cross-section, thus producing a stranded, transposed conductor member with maximum copper cross-section but with adequate insulation between strands. This member constitutes a single subconductor of the complete conductor bar. The necessary number of these subconductors is assembled with at least one coolant tube of the same outside dimensions as the subconductors. The subconductors and the coolant tube are placed together in two stacks and transposed by crossovers between the stacks in a conventional Roebel transposition to form a complete conductor bar which meets all the requirements.

BRIEF DESCRIPTION OF THE DRAWINGS

The invention will be more fully understood from the following detailed description, taken in connection with the accompanying drawing, in which:

FIG. 1 is a top view of a complete conductor bar embodying the invention;

FIG. 2 is a side view of the conductor bar;

FIGS. 3A, 3B, 3C and 3D are diagrammatic sectional views on the planes indicated at AA, BB, CC and DD, respectively, in FIG. 1;

DESCRIPTION OF THE PREFERRED EMBODIMENT

Figure 4:
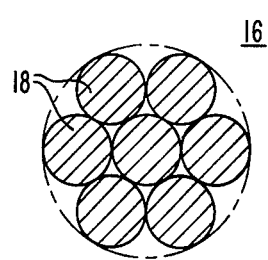
FIG. 4 is a transverse sectional view of a bundle of strands.

FIGS. 1 and 2 show a complete conductor bar embodying the invention. As previously explained, such a conductor must be capable of operation in a high flux density environment, and be capable of carrying high currents with low losses and without excessive heating. The conductor bar disclosed herein meets these requirements. As shown in the drawing, the conductor bar 10 is made up of a suitable number of subconductors 12 of square cross-section, and a tube 14 for coolant, disposed in two side-by-side stacks which are transposed by crossovers between the stacks in a conventional Roebel transposition (Roebel U.S. Pat. No. 1,144,252). This is a well known arrangement in which the conductors in each stack are inclined so that each conductor moves radially to the top or bottom, crosses over to the other stack, moves oppositely through the stack and crosses over back to the first stack. Thus, looking at the end of the bar, each conductor moves through an angle of 360° in going from one end of the bar to the other and occupies the same relative position at both ends. Each conductor, therefore, occupies all positions in the bar for equal distances, so that the conductor is completely transposed and the voltages of the different conductors are exactly balanced. This is further illustrated by the diagrams of FIGS. 3A, 3B and 3C in which the individual subconductors of which the bar is made up are designated by the letters a . . . j and their relative positions at the ends and at the center of the bar are shown.

As discussed above, a conventional conductor bar 10 such as that shown in FIGS. 1 and 2 using solid conductors in the usual manner would not meet the requirements for advanced, high power density machines. In machines with superconducting field windings, for example, an air gap stator winding is used which must operate in a much higher flux density than is found in conventional machines. Similar conditions are found in other types of advanced machines now under development. As explained above, in order to meet the requirements, the conductor bars to be used in such windings must be finely stranded and fully transposed as well as incorporating effective cooling means. In accordance with the invention, therefore, the individual subconductors 12 of which the conductor bar 10 is made up are themselves stranded and transposed, and a coolant tube 14 is included in the stack at the position designated c in the drawing and is carried through the Roebel transposition with the subconductors.

Figure 5:
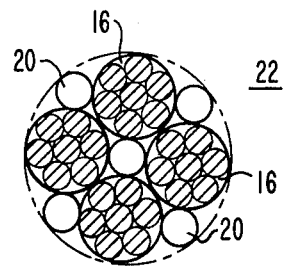
FIG. 5 is a similar view of a completed stranded cable.
Figure 6:
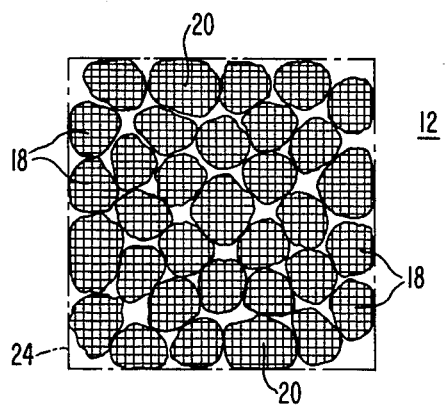
FIG. 6 is a transverse view of a complete subconductor.

The construction of the individual subconductors 12 of which the conductor bar 10 is made up is shown in detail in FIGS. 4–6. As previously indicated, individual strands must be relatively small and, in the preferred embodiment, the strands consist of fine, insulated copper wire. Thus, in an illustrative embodiment of the invention, the subconductor 12 includes a number of twisted bundles 16 of strands 18 of #23 AWG copper wire which has a diameter of 0.0226 inch. As shown in FIG. 4, seven of these strands 18 are assembled in a bundle with six of the strands cabled or wound around the seventh which runs axially through the center. This operation may be carried out on a conventional tubular strander in which the outer strands are cabled or wound onto the central strand to form a twisted bundle of strands.

The next step is shown in FIG. 5 in which a number of the twisted bundles 16 are assembled with individual strands in a cable. In the illustrative embodiment, four twisted bundles 16 as described above are assembled with five individual strands 20 of #21 AWG copper wire, which has a diameter of 0.0285 inch. The 2 different sizes of wire are utilized to maximize the copper packing density. The bundles 16 and strands 20 are assembled in the manner shown in FIG. 5 and are twisted or wound into a complete cable 22 using conventional equipment such as a drum twisting machine. The direction of twist of the cable 22 should be the same as that of the twisted bundle 16 so as to avoid possible damage to the strand insulation by crossovers of the strands utilizing a pitch of less than 1 twist per inch. The completed cable 22 is then compacted to reduce its dimensions by approximately 8%–14% to maximize the removal of voids, to minimize the probability of strand to strand shorts, and to form a square cross-section, as shown in FIG. 6, which is the final form of the subconductor 12. This is preferably done immediately after cabling, before winding on a spool by a series of suitable dies which compact and form the conductor to the configuration shown without damage to the strand insulation.

Figure 7:
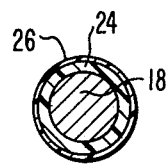
FIG. 7 is a sectional view of a strand.

As shown in FIG. 7, each of the strands 18 and 20 is an insulated copper wire of small size. The insulation 24 and 26 may be of any suitable type, but preferably consists of a first coating or film of a conventional wire enamel 24, such as a modified polyester, which may be of the order of 1 mil in thickness and which is a thermosetting material, and with a second coating or overcoat of an epoxy resin 26 which may be about $\frac{1}{2}$ mil in thickness and which is a thermoplastic material. After completion of the subconductor 12, as shown in FIG. 6, it is heated and then allowed to cool in a straight die to set the epoxy resin, so that the strands remain embedded in a rigid insulating matrix to form a solid straight subconductor of controlled predetermined cross-section which can be handled and subjected to further forming in the same manner as a solid bar without damage to the insulation between strands.

The complete conductor bar 10 is then produced by assembling the necessary number of subconductors 12 into a transposed conductor bar. In the preferred embodiment, the subconductors are assembled in two side-by-side stacks of five conductors each as shown in FIGS. 1–3. In order to obtain the necessary effective cooling, however, one conductor is replaced by a coolant tube 14 in the position designated c in the diagrams of FIGS. 3A–3C. The coolant tube 14 is a square tube of the same outside dimensions as the subconductors 12 and with sufficient interior area to carry the required flow of a coolant fluid such as water. The tube 14 is preferably made of a high resistance material such as stainless steel or the alloy identified as INCONEL. The use of a high resistance material for the tube 14 prevents it from carrying any substantial current so that it does not itself contribute significantly to the total loss in the conductor. The tube is preferably insulated with an enamel insulation to reduce the chance of the tube electrically contacting the strands of the subconductor 12 which would allow eddy currents to flow from strand to strand through the tube 14. The individual subconductors 12 together with the coolant tube 14 are individually bent as required to form the crossovers between stacks and are then assembled as shown in FIGS. 1 and 2 into a completely transposed conductor bar 10. This type of transposition is well known in the art, as previously indicated; however, special testing and procedures are required to produce a stranded conductor with the contradictory requirements of maximum copper volume and minimum number of shorts between strands. Individually bending the subconductors 12 requires particular precaution to prevent strand-to-strand shorts. The rate of wire movement during the bending operation should be relatively slow and provision must be made to allow free movement of the strands perpendicular to the bending plane. Once the predetermined bends are made, the area perpendicular to the plane of the bends is compressed to a size of approximately 2 to 4 mils smaller than the undeformed dimension of the subconductor 12.

After completion of the bending and compression of the bends, the ends of the subconductors are stripped of insulating material, separated and tested for strand-to-strand shorts. Upon completion of successful strand-to-strand short test, the separated ends are cut off and insulation is removed from approximately $\frac{1}{2}$ inch of each end of the subconductors. The subconductors 12 are assembled by aligning the ends and setting the subconductors with the Roebel bends in the proper relative positions. A pressure sensitive Kapton or other insulating strip 28 2 or 3 mils in thickness is disposed adjacent the Roebel bends and adjacent the subconductor 12 or tube 14 so that the Kapton strip 28 extends approximately $\frac{1}{2}$ to $\frac{3}{4}$" beyond the Roebel bends. As described hereinbefore, the subconductors are compressed about 2 to 4 mils in area perpendicular to the plane of the bends. This allows the application of the Kapton strips 28 adjacent the Roebel bends without sacrificing the precision with which the overall dimensions are to be maintained. The purpose of the strip to eliminate subconductor-to-subconductor shorts adjacent the Roebel bends. A resin system is applied to the area adjacent the Roebel bends and the conductor is pressed in a mold to a predetermined size. The ends of the subconductors have already been stripped of insulating material and are separated by thin Mylar insulation strips (not shown) and tested for subconductor-to-subconductor shorts. No low resistance shorts can be tolerated in this test. Upon the completion of tests for subconductor-to-subconductor shorts, the Mylar insulating strips are removed from the end of the conductor and the conductor with the Kapton strips adjacent the Roebel bends are left in the mold and allowed to cure fully, thus producing a rigid stranded conductor with close dimensional tolerances with very few or no strand-to-strand shorts and no subconductor-to-subconductor shorts and having a maximum volume of copper. The conductor bar 10 may be insulated by wrapping with tape or in any necessary or desired manner. The coolant tube 14 is preferably allowed to extend beyond the ends of the subconductors 12 at both ends of the bar 10 to facilitate connections to a coolant system.

It should now be apparent that a conductor bar has been provided which meets the requirements outlined above. That is, the bar is finely stranded and fully transposed, both radially and tangentially, since it is made up of subconductors which are themselves stranded and fully transposed. The necessary coolant provision is made by incorporating a coolant tube into the bar and, if desired, additional coolant tubes could be incorporated into the conductor in the same manner as the one shown provided sufficient cross-section of copper is still available. A highly efficient conductor bar is this provided which is capable of operating in a high flux density environment with relatively low losses and high current conducting capacity.

What is claimed is:

1. A conductor bar for a dynamoelectric machine comprising a plurality of subconductors, said subconductors being comprised of a pluarlity of insulated conducting strands disposed in a plurality of twisted bundles forming cables and a plurality of individual insulated conducting strands twisted with the cables and compressed into a fully transposed subconductor having a generally square cross-section, said subconductors being disposed in two side-by-side stacks and being transposed by cross overs between said stacks, said cross overs being formed by bending said subconductors at predetermined locations, and insulating strips disposed at the bend locations so as to separate the bent portion of the subconductors from the remainder of the conductor bar whereby the conductor bar is compressed at the bend locations to provide a more uniform dimensioned conductor bar free of strand-to-strand and subconductor-to-subconductor shorts.

2. A conductor bar as defined in claim 1 in which each of said cables is compacted and formed to a substantially square cross-section.

3. A conductor bar as defined in claim 2 in which the strands of each cable are embedded in an insulating resin.

4. A conductor bar as defined in claim 1 and further comprising a hollow tube for coolant flow disposed in the side-by-side stacks, said coolant tube being transposed by crossing over between stacks.

5. A conductor bar as defined in claim 1, in which the insulating strip extends approximately ½ to ¾" on either side of the bends.

* * * * *